United States Patent
Surprise et al.

(10) Patent No.: US 11,797,740 B2
(45) Date of Patent: Oct. 24, 2023

(54) EVEN APPORTIONMENT BASED ON POSITIVE TIMING SLACK THRESHOLD

(71) Applicant: International Business Machines Corporation, Armonk, NY (US)

(72) Inventors: Jesse Peter Surprise, Highland, NY (US); Eduard Herkel, New York, NY (US); Ofer Geva, Poughkeepsie, NY (US); Michael Hemsley Wood, Wilmington, DE (US); Chris Aaron Cavitt, Queensbury, NY (US); Tsz-Mei Ko, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 62 days.

(21) Appl. No.: 17/671,894

(22) Filed: Feb. 15, 2022

(65) Prior Publication Data
US 2023/0259679 A1    Aug. 17, 2023

(51) Int. Cl.
*G06F 30/30*    (2020.01)
*G06F 30/3312*    (2020.01)
(Continued)

(52) U.S. Cl.
CPC ........ *G06F 30/3312* (2020.01); *G06F 30/337* (2020.01); *G06F 2119/12* (2020.01)

(58) Field of Classification Search
None
See application file for complete search history.

(56) References Cited

U.S. PATENT DOCUMENTS 7,836,418 B2 * 11/2010 Binder ............... G06F 30/3312
716/108
7,853,912 B2    12/2010 Binder et al.
(Continued)

OTHER PUBLICATIONS

Fields et al.; "Slack: Maximizing Performance Under Technological Constraints", In Proceedings 29th Annual International Symposium on Computer Architecture (ISCA'02) (May 2002) pp. 47-58.
(Continued)

*Primary Examiner* — Leigh M Garbowski
(74) *Attorney, Agent, or Firm* — Cantor Colburn LLP; Nathan Rau

(57) ABSTRACT

A system is provided to perform slack apportionment for an integrated circuit. The system includes a time calculation module and a slack apportion module. The time calculation module determines an arrival time corresponding to a target pin in signal communication with a signal path. The slack apportion module determines a total slack associated with the signal path and determines a slack threshold value that is equal to a portion of the total slack. The time calculation module further determines an apportioned arrival time associated with the signal path based on the arrival time and a delay offset value. The slack apportion module further determines a residual slack apportionment value based on a residual slack and the number of macros associated with the signal path. Accordingly, the time calculation module determines a modified apportioned arrival time based on the residual slack apportionment value and the apportioned arrival time.

20 Claims, 6 Drawing Sheets

(51) Int. Cl.
    *G06F 30/337*    (2020.01)
    *G06F 119/12*    (2020.01)

(56) References Cited

U.S. PATENT DOCUMENTS

| | | |
|---|---|---|
| 8,473,884 B2 | 6/2013 | Daede et al. |
| 10,048,316 B1 | 8/2018 | Coutts et al. |
| 10,755,009 B1 | 8/2020 | Bradley |
| 10,831,958 B2 | 11/2020 | Geva et al. |
| 10,970,455 B1 | 4/2021 | Sinha et al. |
| 11,023,634 B1 | 6/2021 | Romain et al. |
| 2009/0241079 A1 | 9/2009 | Binder et al. |
| 2017/0004247 A1 | 1/2017 | Berry et al. |
| 2017/0132347 A1 | 5/2017 | Kalafala et al. |
| 2020/0279068 A1 | 9/2020 | Chen et al. |
| 2021/0011980 A1 | 1/2021 | Peddawad et al. |
| 2021/0216692 A1 | 7/2021 | Whitty et al. |

OTHER PUBLICATIONS

Kahng et al.; "Slack Redistribution for Graceful Degradation Under Voltage Overscaling", 2010 15th Asia and South Pacific Design Automation Conference (ASP-DAC) (Jan. 2010) pp. 825-831.

Liu et al.; "Simultaneous Slack Budgeting and Retiming for Synchronous Circuits Optimization", 2010 15th Asia and South Pacific Design Automation Conference (ASP-DAC) (Jan. 2010) pp. 49-54.

Seomun et al.; "Bounded Potential Slack: Enabling Time Budgeting for Dual-Vt Allocation of Hierarchical Design", 2010 15th Asia and South Pacific Design Automation Conference (ASP-DAC) (Jan. 2010) pp. 581-586.

Viswanathan et al.; "ITOP: Integrating Timing Optimization Within Placement", In Proceedings of the 19th international symposium on Physical design (Mar. 2010) pp. 83-90.

\* cited by examiner

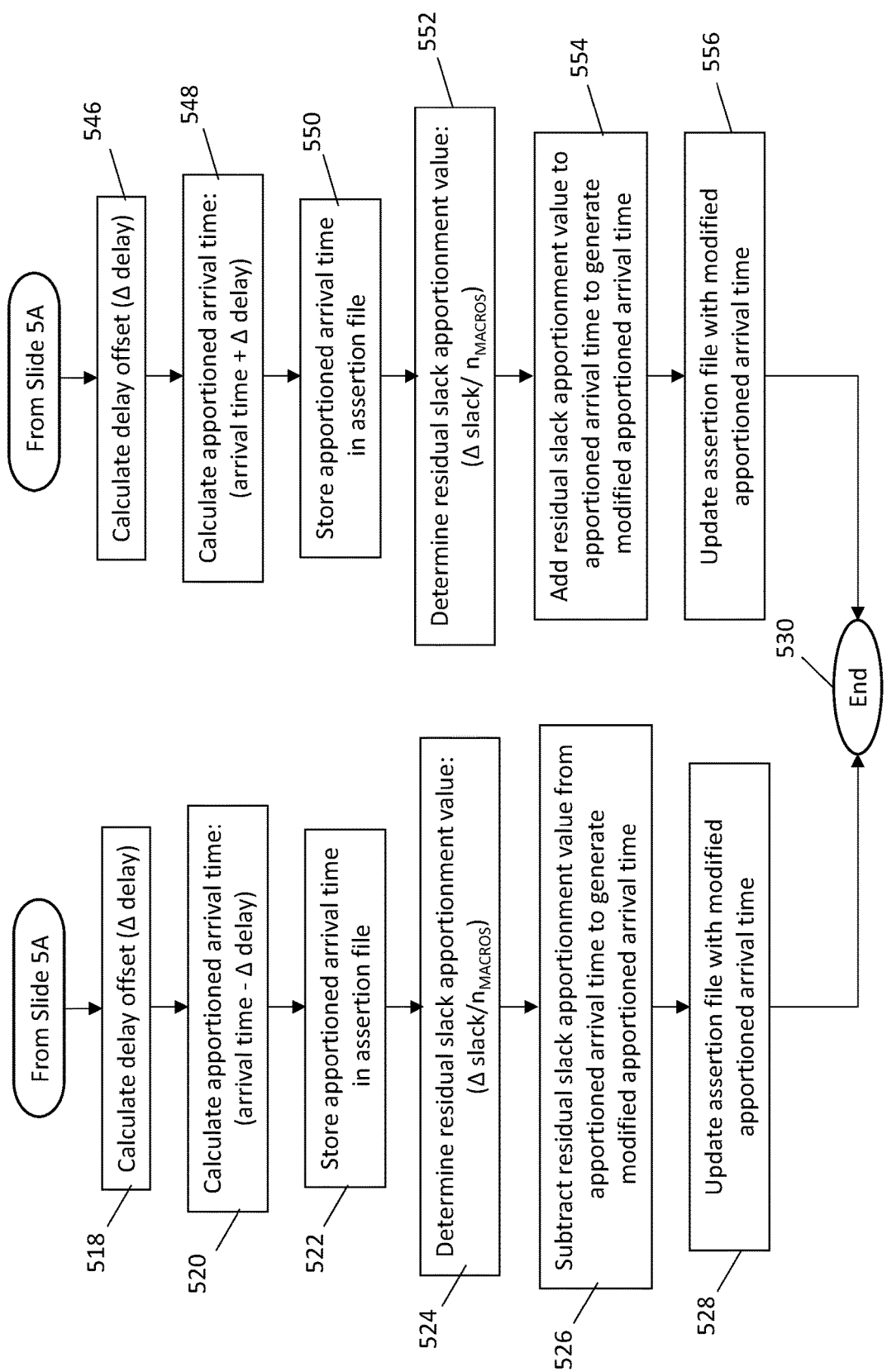

EVEN APPORTIONMENT BASED ON POSITIVE TIMING SLACK THRESHOLD

BACKGROUND

The present disclosure generally relates to the fabrication and design of semiconductor chips and integrated circuits, and more particularly to circuit timing and circuit design of integrated circuits.

Microprocessor design typically involves the layout of integrated circuits (ICs) and the timing analysis of logic components such as, for example, latches, which provides measurements of slack times of transparent latches in the IC design. Following a timing analysis, underperforming slack measurements are typically improved using slack apportionment techniques, which move (i.e., "apportion") available slack from either an input or output side of a latch or electrical component to another output or input of the component. Apportionment of the slack in turn modifies a clock launch and/or a data line arrival time to achieve targeted timing requirements.

SUMMARY

According to a non-limiting embodiment, a computer-implemented method is provided to perform slack apportionment for an integrated circuit (IC). The method comprises selecting a target pin corresponding to a signal path for slack apportionment and determining an arrival time corresponding to the target pin, and determining a total slack associated with the signal path and determining a slack threshold value that is equal to a portion of the total slack. The method further comprises determining an apportioned arrival time associated with the signal path based on the arrival time and a delay offset value, and determining a residual slack apportionment value based on a residual slack and the number of macros associated with the signal path. The method further comprises determining a modified apportioned arrival time based on the residual slack apportionment value and the apportioned arrival time.

According to another non-limiting embodiment, a system is provided to perform slack apportionment for an integrated circuit. The system includes a time calculation module and a slack apportion module. The time calculation module determines an arrival time corresponding to a target pin in signal communication with a signal path. The slack apportion module determines a total slack associated with the signal path and determines a slack threshold value that is equal to a portion of the total slack. The time calculation module further determines an apportioned arrival time associated with the signal path based on the arrival time and a delay offset value. The slack apportion module further determines a residual slack apportionment value based on a residual slack and the number of macros associated with the signal path. Accordingly, the time calculation module determines a modified apportioned arrival time based on the residual slack apportionment value and the apportioned arrival time.

According yet another non-limiting embodiment, a computer program product is provided to control a system to perform slack apportionment for an integrated circuit (IC). The computer program product comprises a computer readable storage medium having program instructions embodied therewith. The program instructions are executable by an electronic computer processor to control the system to perform operations comprising selecting a target pin corresponding to a signal path for slack apportionment and determining an arrival time corresponding to the target pin, and determining a total slack associated with the signal path and determining a slack threshold value that is equal to a portion of the total slack. The operations further comprise determining an apportioned arrival time associated with the signal path based on the arrival time and a delay offset value, and determining a residual slack apportionment value based on a residual slack and the number of macros associated with the signal path. The operations further comprise determining a modified apportioned arrival time based on the residual slack apportionment value and the apportioned arrival time.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIGS. 5A and 5B depict a flow diagram illustrating a method of distributing an even apportionment of slack in an IC design and fabrication process according to a non-limiting embodiment of the present invention.

Figure 1:
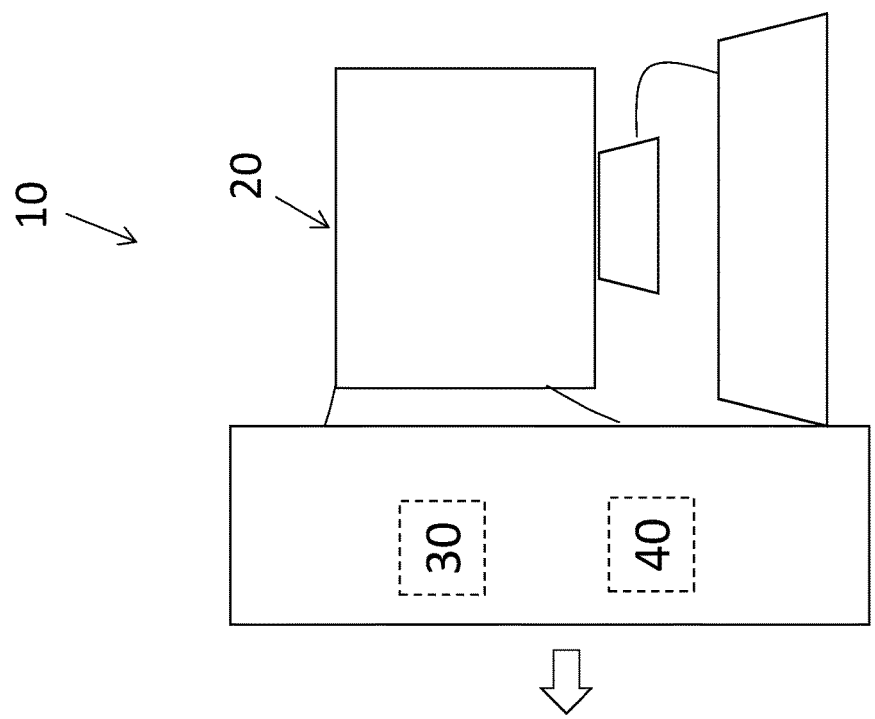
FIG. 1 is a block diagram of a system configured to fabricate an integrated circuit (IC) according to a non-limiting embodiment of the present invention.
Figure 1:
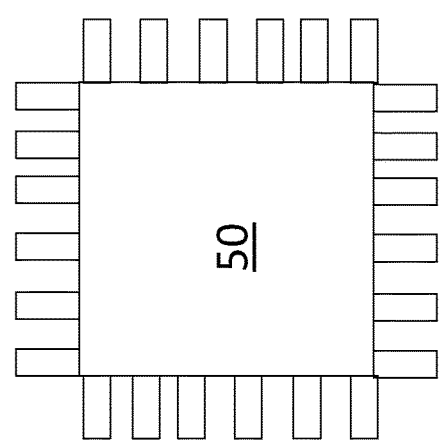

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

In an integrated circuit (IC) design process, the overall IC design is typically separated into smaller pieces or units referred to as "function blocks". As with many processes, separating the design into smaller more manageable function blocks can make the large task more manageable. The function blocks can also be viewed as separate levels of a "physical hierarchy." Separating the design into functional blocks allows the design effort including layout, integration, and timing analysis to be spread out among multiple engineers and designers or multiple design groups.

As part of the initial design or conceptual design, input and output timing specifications, sometimes referred to as "timing assertions" can be assigned to the signals entering and exiting the function blocks. Such timing assertions that are assigned to each function block can define targeted timing conditions/specifications that are required at the boundaries/pins/interface/interconnection of each function block. The timing assertions can include, for example, an estimated time of arrival (ETA) value, a primary input specification (PIS) value, and/or a primary output specification (POS) value. The ETA value is indicative of an arrival time target for an output pin in the circuit design. The ETA value can indicate a required arrival time (RAT) indicating a time required for a signal to arrive at an output pin. The PIS value is indicative of the arrival time and slew at the input pin. The POS value is indicative of a load for each of the output pins in the circuit design.

Many design processes have an initial design goal regarding timing assertions, and as the design progresses various data can show that the targeted timing assertions cannot be met and results in one or more timing deficiencies. Thus, as a design of a function block evolves, meeting parts of the initial specification may be impossible or economically unfeasible. When this occurs, timing assertions for the function blocks on the time deficient signal paths (i.e., failing paths) can be refined or readjusted using timing data from the parent level of hierarchy (with all blocks connected together). Such an adjustment can force the designer of the function block to "close" timing at the function block boundaries based upon the current conditions of its immediate parent (upstream function block).

To reduce the number of adjustments, a timing analysis is typically performed after an attempt is made to design all of the function blocks and the blocks are connected together. The timing analysis serves to analyze the propagation of signals over a given signal path and provides data indicating whether one or more signals propagate too slowly (i.e., lag) or whether one or more signals propagate too quickly (i.e., lead) in reaching a target component (e.g., latch). The lagging or leading of a signal is referred to generally as a "timing deficiency," and the amount of lag time or lead time is commonly referred to as slack time or simply "slack".

Slack, more specifically, can be defined as an amount of time a task can be delayed without causing another task to be delayed or impacting the completion time of an electrical circuit design. Slack can be measured as a difference between a desired time or required arrival time (RAT) for a timing path and an achieved time or actual arrival time (AT) for the timing path. When an input to a latch arrives later than desired, this results in a negative input slack, or the desired time is before the achieved time. A negative slack means that a data signal is unable to traverse Boolean or combinational logic between a start point and an endpoint of a timing path fast enough to ensure an electrical circuit functions as designed. Alternatively, when an input to the latch arrives sooner than desired, this results in a positive input slack, or the achieved time is before the desired time. An arrival time is the time at which a signal arrives at a given point in the design, and is measured at the 50% point of the rising or falling edge transition. When an input or output on a latch is available later than desired, this results in a negative input/output slack, and when the input/output on the latch is available sooner than desired, this results in a positive input/output slack.

A conventional technique for improving slack involves adjusting or "apportioning" the slack of a time deficient signal path. One method of performing slack apportionment involves allocating the correction of timing deficiencies across each function block or macro according to the portion of the total path contained within each function block or macro. Thus, delay can be added to or removed from the current signal arrival time by apportioning available slack across the time deficient signal path. The proposed or "newly required" arrival time for the signal can reflect the amount of slack that has been apportioned to the upstream path of the location under analysis. Additionally, this can leave the remaining slack to be fixed by the downstream function block or by the remainder of the path.

An attempt to further improve conventional slack apportionment methods involves splitting up slack based on how much delay each hierarchical element consumes. For a negative path, the sink element is always relaxed and the source element is always tightened, while for a positive path the source is always relaxed and the sink is always tightened. This conventional technique, however, provides a very small amount of positive slack may for allocation to downstream macros which creates limits when aiming to achieve power reduction. Tightening an existing positive path may also force the tightened sink to work harder and require the corresponding block to implement "leakier" components, wider wires (causing increase congestion), and unnecessary path synthesis prioritization. Moreover, applying positive slack to existing highly positive signal paths can result in one or more function blocks receiving very tight timing budgets, or even timing budgets that cannot be achieved.

Various non-limiting embodiments of the invention improves on conventional slack apportionment methods by providing an IC timing analysis system configured to perform slack apportionment by applying an even apportionment of slack to a time deficient signal path based on a positive slack threshold. The IC timing analysis system determines the positive slack threshold and performs a timing analysis on a targeted signal path to determine whether target timing assertions are met. When the target timing assertions are not met, the total slack of the target signal path is determined and is apportioned based on the positive slack threshold. A first portion of the total slack that is less than or equal to the positive slack threshold is apportioned based on a "path ratio" indicating the relationship between the sum of a total path delay of the signal path and the total slack with respect to the total path delay itself. A new apportioned arrival time for the estimated time of arrival ETA file of an output pin or the PIS file of an input pin can then be established based on the first slack portion. Accordingly, the signal path is initially apportioned as if it experienced a lower slack equal to the positive slack threshold. The remaining second portion of the total slack is then apportioned evenly among all the macros associated with the target signal path. Thus, the remaining positive second slack portion can be subtracted from the apportioned arrival time set in the PIS or added to the apportioned arrival time set in the ETA file. In this manner, a significantly larger positive slack allocation is available to downstream macros to achieve significant power reduction compared to traditional slack apportionment techniques.

With reference now to FIG. 1, a system 10 configured to fabricate an IC 50 is illustrated according to a non-limiting embodiment of the present invention. The system 10 includes processing circuitry 20 used to generate the design that is ultimately fabricated into the IC 50. The processing circuity 20 includes one or more processors 30 and memory 40 storing one or more software programs, code, and/or applications (collectively referred to as software).

The software can include, but is not limited to, computer readable program instructions for carrying out operations of the present invention, assembler instructions, instruction-set-architecture (ISA) instructions, traffic generator and simulator programs, workload traces, cache layout information, instruction and data addresses, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The memory 40 can also store computer readable program instructions, which may execute entirely on the user's computer, partly on the user's computer, as a stand-alone software package, partly on the user's computer and partly on a remote computer or entirely on the remote computer or server.

The memory 40 can also include software that establishes an IC simulator capable of defining, capturing, and/or manipulating design specifications of an IC in a hardware description language (HDL), such as VHDL (very high speed integrated circuit hardware description language, IEEE standard 1076) or Verilog® (IEEE standard 1364; "Verilog" is a registered trade mark of Cadence Design Systems, Inc.). The resulting HDL description typically characterizes the IC at a level of abstraction, such as a register transfer level (RTL), or a behavioral level.

A compiler is used to transform the HDL description into a "compiled model" of the IC. A simulator is then used to verify proper functional operation of the compiled model according to the design specification. Once the compiled model has been functionally verified, a synthesizer is used to map the compiled model to technology-specific logic gate structures, producing a logic level "netlist." Following further functional verification and/or timing verification, suitable positions of the logic gate structures of the netlist relative to one another are determined.

The steps involved in the fabrication of the integrated circuit 50 are well-known and briefly described herein. Once the physical layout is finalized, the finalized physical layout is provided to a foundry. Masks are generated for each layer of the integrated circuit based on the finalized physical layout. Then, the wafer is processed in the sequence of the mask order. The processing includes photolithography and etch. This is further discussed with reference to FIG. 2

Figure 2:
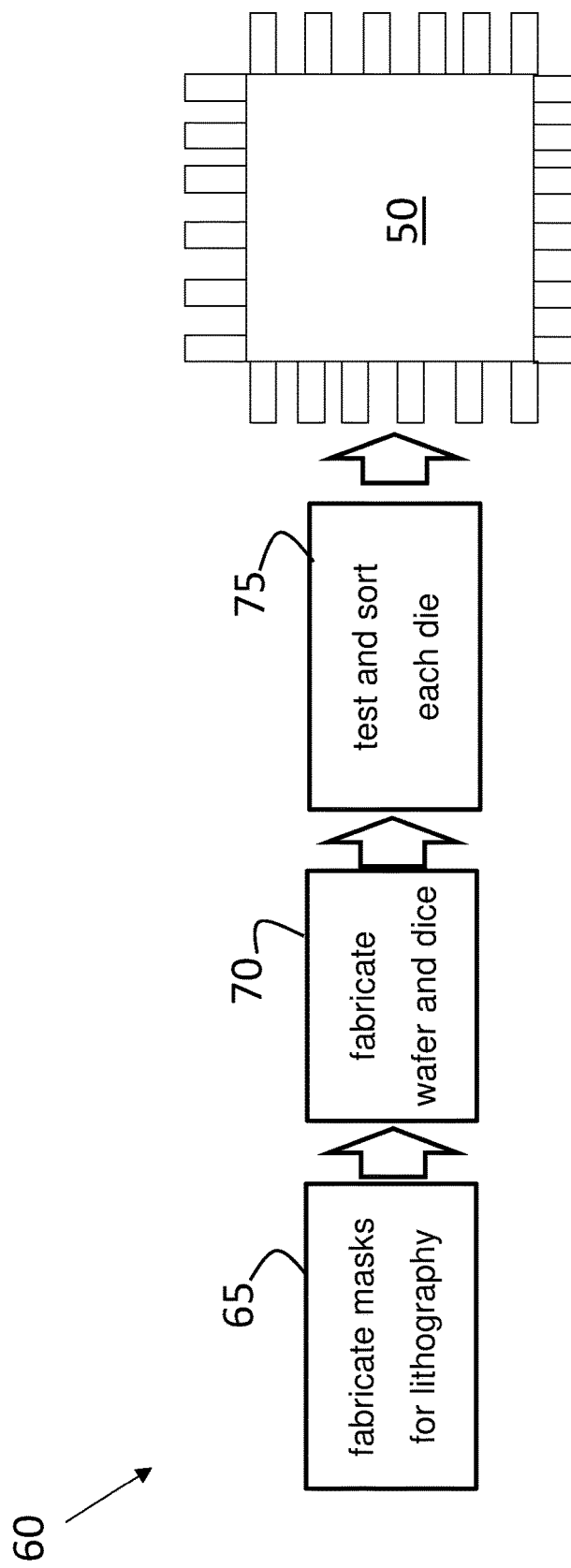
FIG. 2 is a block diagram depicting a process flow for fabricating an integrated circuit according to a non-limiting embodiment of the invention.

Turning to FIG. 2, a process flow 60 for fabricating the integrated circuit 50 is illustrated according to a non-limiting embodiment of the invention. Once the physical design data is obtained, the integrated circuit 50 can be fabricated according to known processes. For example, a wafer with multiple copies of the final design is fabricated and cut (i.e., diced) such that each die is one copy of the integrated circuit 50. At block 65, the processes include fabricating masks for lithography (e.g., transistor masks, diode masks, and metallization masks) based on the finalized physical layout. At block 70, fabricating the wafer includes using the masks to perform photolithography and etching. Once the wafer is diced, testing and sorting each die is performed, at block 75, to filter out any faulty die before providing the fabricated integrated circuit 50.

Figure 3:
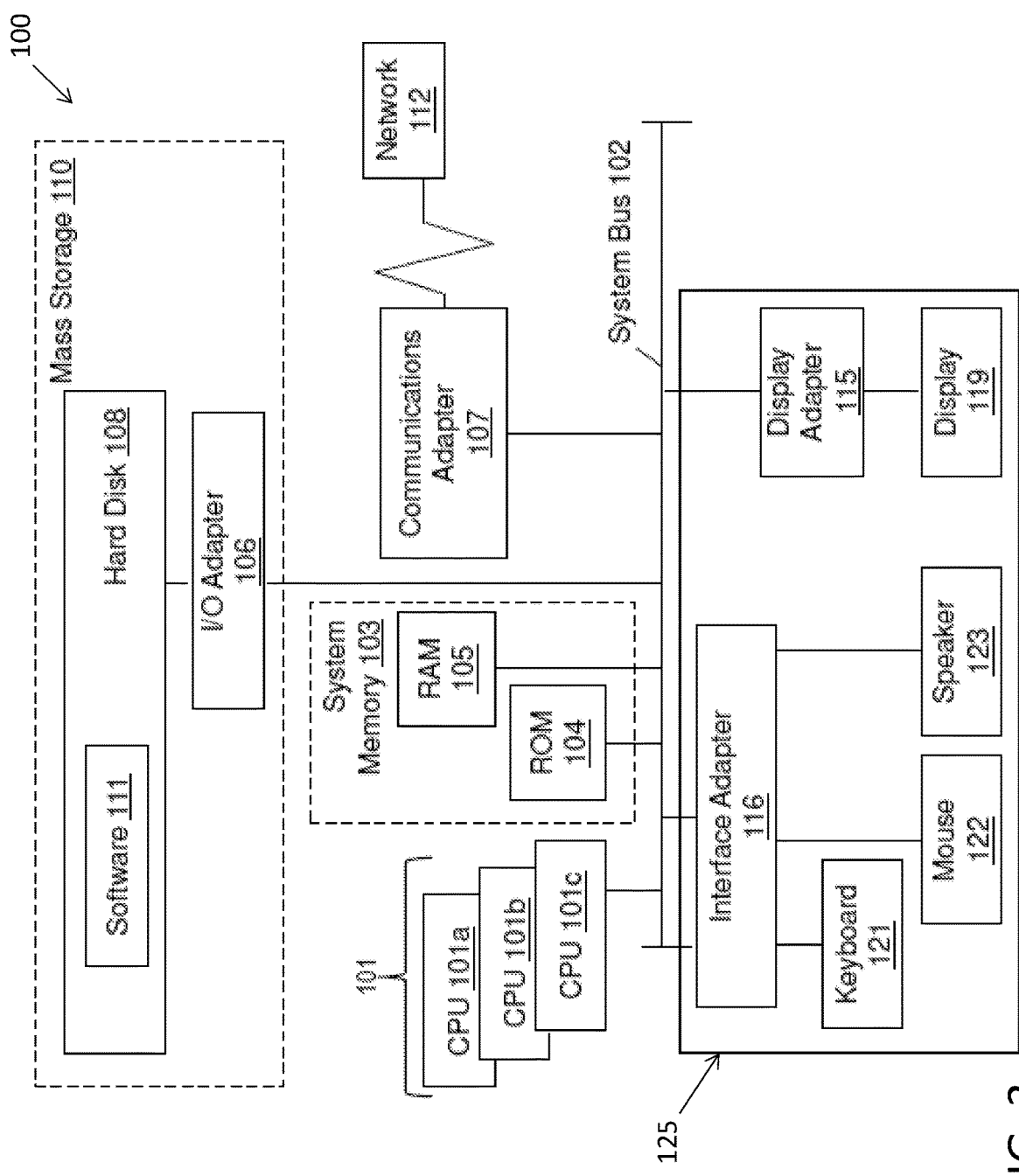
FIG. 3 depicts a block diagram of an example computer system in accordance with a non-limiting embodiment of the present invention.

FIG. 3 depicts a block diagram of an example computer system 100 for use in conjunction with one or more embodiments of the present invention. The computer system 100 is capable of performing slack apportionment in an IC design by applying an even apportionment of slack to a time deficient signal path based on a positive slack threshold.

The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 3.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. The keyboard 121, a mouse 122, a speaker 123, interface adapter 116, display 119, and display adapter 115 can be collectively referred to as an I/O interface 125 or graphical user interface GUI 125. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 3, the computer system 100 includes processing capability in the form of the processors 101, and storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 3 is not intended to indicate that the computer system 100 is to include all of the components shown in FIG. 3. Rather, the computer system 100 can include any appropriate fewer or additional components not illustrated in FIG. 3 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 4:
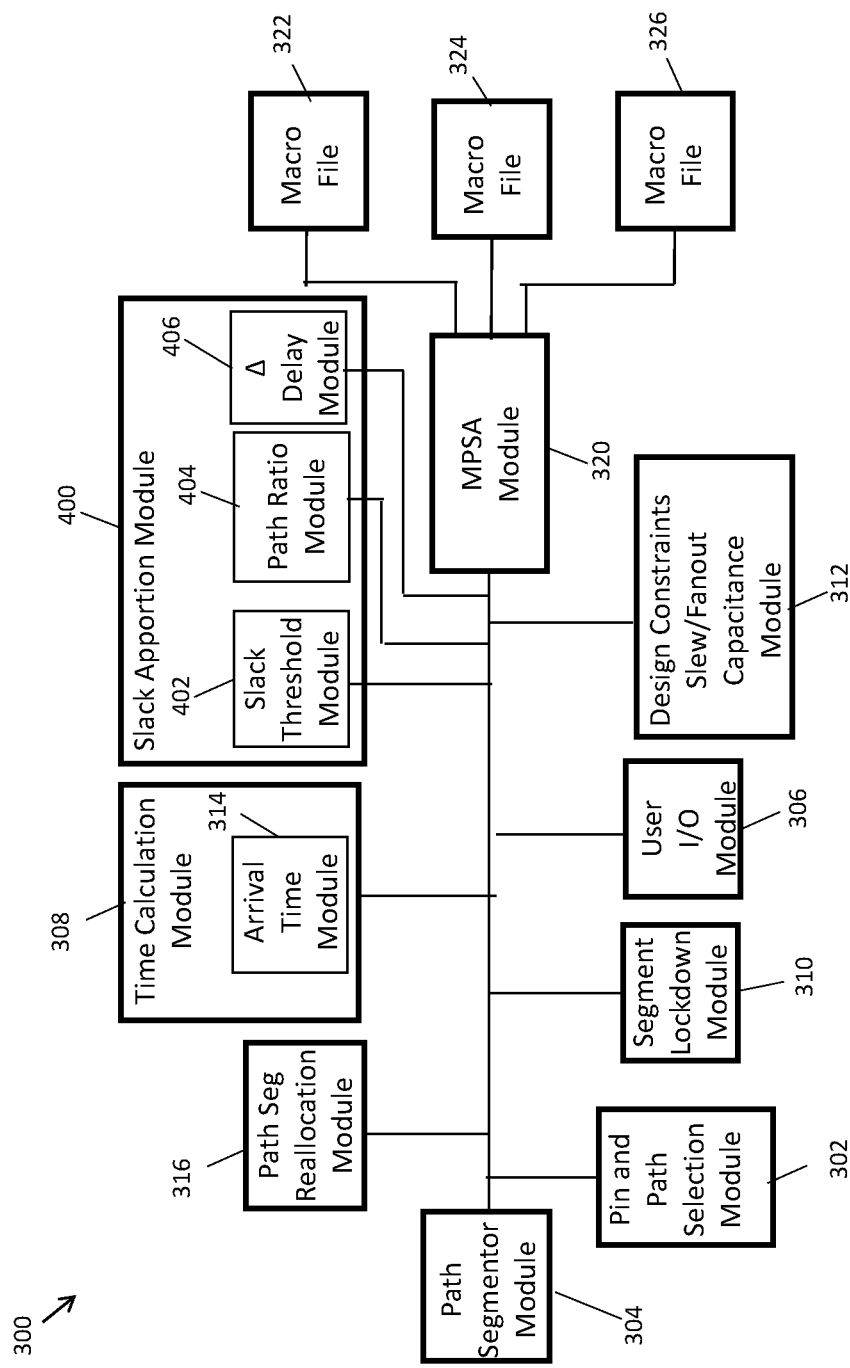
FIG. 4 is a block diagram illustrating a system configured to perform slack apportionment in an IC design according to a non-limiting embodiment of the present invention.

With reference now to FIG. 4, a system 300 capable of facilitating slack apportionment in an IC design is illustrated according to a non-limiting embodiment of the present invention. The system 300 can include a pin and path (pin/path) selection module 302, a path segmentor module 304, a user input/output (I/O) module 306, an arrival time module 314, a segment reallocation module 316, a segment freeze/lockdown module 310, a timing calculation module 308, a macro/path segment assembler module (MPSA) 320, and macro file input modules 322, 324 and 326. The system 300 shown in FIG. 3 further includes a slack apportionment module 400 capable of facilitating the slack apportionment by applying an even apportionment of slack to a time deficient signal path based on a positive slack threshold as described in greater detail below.

In operation, different macros from different design groups can be entered into the system 300 as files. The files can be related to each other via pins or interconnect information provided by the macro/path segment assembler 320. Accordingly, the macro/path segment assembler 320 can determine the number of macros associated with a given signal path. The pin/path selection module 302 can select a target pin and/or corresponding signal path for timing analysis and/or slack apportionment. In one or more non-limiting embodiments of the invention, the pin/path selection module 302 can select the target pin and determine pin information that can be shared among the various modules in the system 300. The pin information can include, for example, whether the target pin is an input pin configured to deliver data to a corresponding signal path or an output pin configured to receive data from a corresponding signal path. The timing calculation module 308 can calculate timing of a path and determine if the path has timing deficiencies at any location. In one or more non-limiting embodiments, the timing calculation module 308 can include an arrival time module 314 that calculates the arrival time (AT) of a selected timing path and/or one or more segments of a selected timing path. The timing calculation module 308 can utilize data obtained from input design constraints module 312. Design constraints can include slew, fanout and parasitic capacitance to name a few. The timing calculation module 308 can perform a timing analysis on a total signal path from start to finish to determine if timing of the selected path meets a predetermined timing criterion, along with upstream delays and/or downstream delays if they exist. Upstream delay is the delay upstream until encountering a primary input, or the clock pin feed a latch. Downstream delay is the delay forward until encountering a latch test point, or primary output pin. A sum of the upstream delay and the downstream delay can define a total path delay (path delay$_{TOTAL}$) of the total signal path.

The path segmentor module 304 can segment the selected path based on the macros and their interconnect definition. The segment reallocation module 316 can allocate new timing specifications to each segmented path when there is a determination by the timing calculation module 308 that the selected path does not meet the predetermined timing criteria. In some embodiments, the segment reallocation module 316 can determine the entire path length, and the proportion each segment contributes to the entire length. Using this, the segment reallocation module 316 can allocate timing deficiencies to each path segment according to the percentage or proportion of length of the path segment contributes to the total path length.

According to one or more non-limiting embodiments, the segment reallocation module 316 can retime an input IC design with both positive and negative timing deficiencies or slack (i.e. lead and lag). Accordingly, the system 300 can determine new arrival times, for example, to correct positive slacks in a manner that can significantly reduce power consumption. Since the slack can be apportioned automatically on a path-by-path basis, timing at all levels of the hierarchy can be integrated to achieve a common goal.

The segment lockdown module 310 can lock down at least a portion of the path, such that the segment reallocation module 316 will not modify the timing specification for a portion of a path that is locked out or has a "design freeze." In some embodiments, the segment reallocation module 316 can apportion the timing deficiencies or slack for a specific path across all portions (all function blocks) along the path. The apportionment of the total slack across each functional block can be based upon the percentage of a total path delay (path delay$_{TOTAL}$) contained within the functional block or "macro." The slack can also be apportioned back to the parent hierarchy for interconnect delays that occur between function blocks. However, the apportionment of slack can be allocated in one of many ways such as manually via input from the user I/O module 306.

With continued referenced to FIG. 4, the slack apportionment module 400 facilitates a slack apportionment process by applying an even apportionment of slack to a time deficient signal path based on a positive slack threshold (slack_TH). A first portion of the total slack that is less than or equal to the positive slack threshold is apportioned based on a "path ratio" indicating the relationship between the sum of the total path delay (path delay$_{TOTAL}$) of the signal path and a portion of the total slack that is equal to the slack threshold.

The time calculation module 308 can then obtain the path ratio from the slack apportion module 400 such that the arrival time module 314 can calculate an apportioned arrival time that modifies the ETA file of a target output pin or a PIS file of a target input pin. The remaining second portion of the total slack is then apportioned evenly among all the macros associated with the targeted signal path, and is either added to the apportioned arrival time in the ETA file or subtracted from the apportioned arrival time in the PIS file. In this manner, a significantly larger positive slack allocation is available to downstream macros to achieve target power reduction goals.

The slack apportionment module 400 includes a positive threshold module 402, a path ratio module 404, and a delay offset (Δ delay) module 406. The positive threshold module 402 determines a positive slack threshold value (slack_TH), and assigns the positive slack threshold value (slack_TH) to a time deficient signal path that is targeted for slack apportionment. The positive slack threshold (slack_TH) can vary according to the particular circuit design and can be input to the system 300 using, for example, the user I/O module 306. Once positive slack threshold is set, a residual slack (Δ slack) can be determined. The residual slack is defined as the total slack, less the slack threshold (slack_TH) and can be defined as follows:

Δslack=(total slack−slack_TH)

The path ratio module 404 is configured to calculate a path ratio based on the positive slack threshold value (slack_TH) associated with the time deficient signal path. The path ratio is indicative of a relationship between the sum of the total path delay (path delay$_{TOTAL}$) of the signal path and the slack_TH with respect to the total path delay (path delay$_{TOTAL}$) itself. In one or more non-limiting embodiments of the present disclosure, the path ratio is expressed as:

$$\text{path ratio} = \frac{(\text{path delay}_{TOTAL} + \text{slack\_TH})}{\text{path delay}_{TOTAL}}$$

The Δ delay module 406 utilizes the calculated path ratio to determine a delay offset value (Δ delay), which offsets an arrival time of a target input pin or target output pin. The delay offset value can be determined based on a timing delay (e.g., an upstream delay) associated with the signal path and the path ratio. In one or more non-limiting embodiments, the delay offset value can be expressed as follows:

Δdelay=(upstream delay*path ratio)−upstream delay.

Accordingly, once the arrival time of a target pin is determined, the delay offset value (Δ delay) is computed using the path ratio, and the computed offset value is then used to modify (i.e., added or subtracted) to the arrival time to generate an apportioned arrival time. For a target input pin, the apportioned arrival time is generated by subtracting the delay offset value (Δ delay) from the arrival time by. For a target output pin, however, the apportioned arrival time is generated by adding the delay offset value (Δ delay) to the arrival time. The assertion file (e.g., the ETA or the PIS) is then updated with the computed apportioned arrival time based on an.

After generating the apportioned arrival time for the target input pin or target output pin, the residual slack (Δ slack) is apportioned equally among the number of macros (n$_{MACROS}$) included in the target path. That is, the apportioned slack (slack$_{APP}$) can be defined as:

$$\text{slack}_{APP} = \frac{\Delta \text{slack}}{n_{MACROS}}$$

The apportioned slack (slack$_{APP}$) is then used to modify the apportioned arrival time and update the assertion file. In terms of a target input pin, for example, the apportioned slack value (slack$_{APP}$) is subtracted from the apportioned arrival time to obtain a modified apportioned arrival time. Accordingly, the PIS in the assertion file is updated with the modified apportioned arrival time. For a target output pin, the apportioned slack value (slack$_{APP}$) is added to the apportioned arrival time to obtain a modified apportioned arrival time. Accordingly, EPA in the assertion file is updated with the modified apportioned arrival time. In either scenario described above, a significantly larger slack allocation is available to downstream macros to achieve target power reduction goals.

The apportioned arrival times and/or modified apportion arrival times can be sent back to the appropriate macro files 322-326. Allowing the macros 322-326 to communicate regularly, allows designers to continually analyze timing on an entire design even though many different groups are working on many different pieces of the design. Thus, timing issues can be evaluated periodically during the "middle" of the design process and based on such an analysis, each design group can receive updated timing requirements. Such a process can provide a give and take between portions of the design and can also freeze portions of the design such that design parameters for the frozen portions of the design will not be allowed to be modified.

Figure 5A:
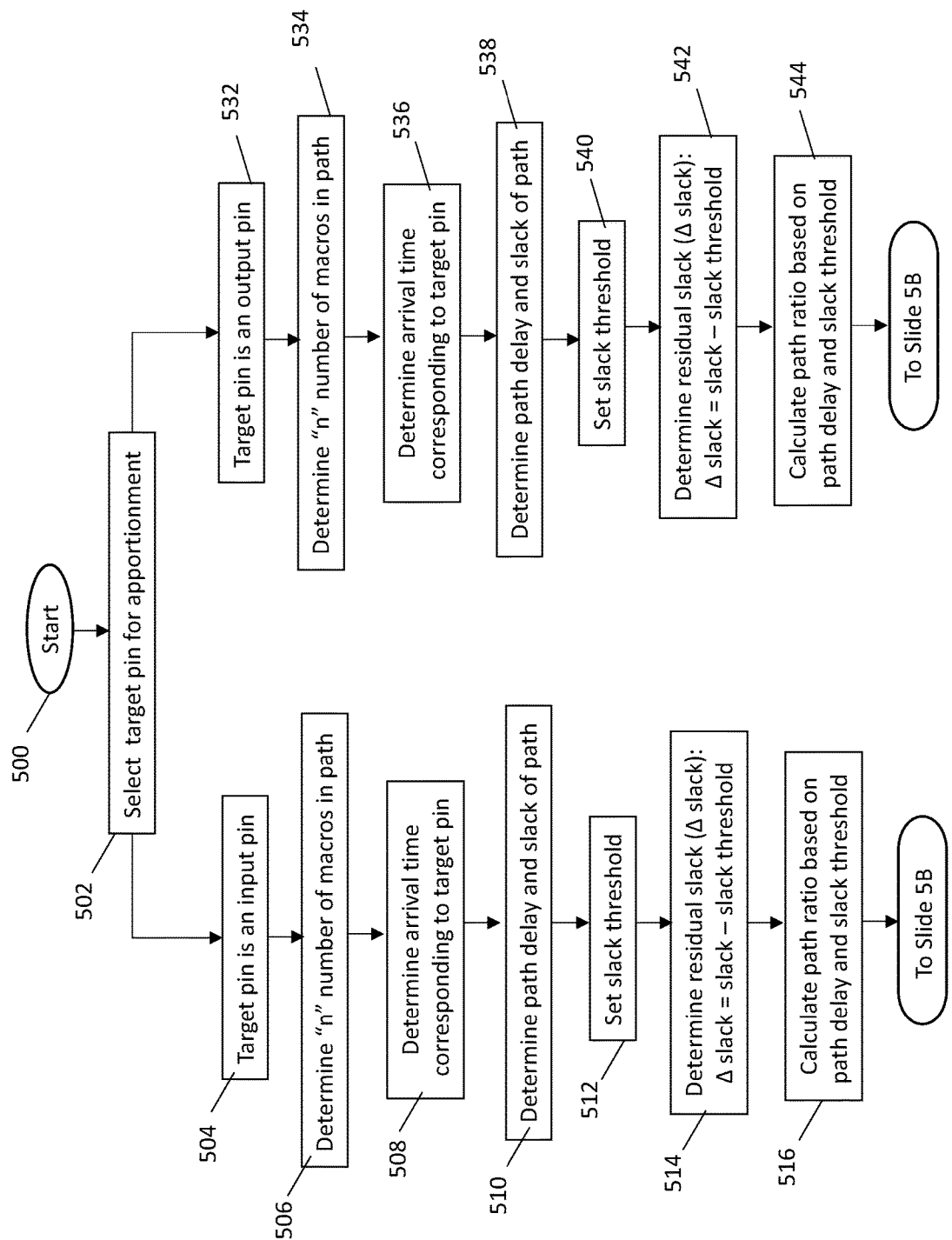

Turning now to FIGS. 5A and 5B, a method of distributing an even apportionment of slack in an IC design and fabrication process according to a non-limiting embodiment of the present invention. The method begins at operation 500 and selects a target pin for slack apportionment at operation 502. The target pin can be an input pin configured to deliver data to a corresponding signal path or an output pin configured to receive data from a corresponding signal path.

Turning to operation 504, the target pin selected is determined to be an input pin and the number ("n") of macros associated with the corresponding signal path is determined at operation 506. At operation 508, the arrival time corresponding to the input pin is determined. At operation 510, the path delay and the total slack of the signal path corresponding to the input pin is determined. At operation 512, a slack threshold (slack_TH) is determined, and at operation

514 a residual slack (Δ slack) is determined based on the total slack and the slack threshold (slack_TH). At operation 516, a path ratio is calculated based on the path delay and the slack threshold (slack_TH).

Turning to FIG. 5B, a delay offset (Δ delay) is calculated at operation 518. At operation 520, an apportioned arrival time is determined based on the arrival time associated with the input pin and the delay offset (Δ delay), and the apportioned arrival time is stored in the assertion file (i.e., the PIS of the assertion file) at operation 522. At operation 524, a residual slack apportionment value (slack$_{APP}$) is determined based on the residual slack (Δ slack) and the number of macros (n$_{MACROS}$). At operation 526, the residual slack apportionment value (slack$_{APP}$) is subtracted from the apportioned arrival time to generate a modified apportioned arrival time. At operation 528, the PIS is updated with the modified apportioned arrival time, and the method ends at operation 530.

Returning to FIG. 5A, the target pin selected for apportionment is determined to be an output pin at operation 532, and the number ("n") of macros associated with the corresponding signal path is determined at operation 534. At operation 536, the arrival time corresponding to the output pin is determined. At operation 538, the path delay and the total slack of the signal path corresponding to the output pin is determined. At operation 540, a slack threshold (slack_TH) is determined, and at operation 542 a residual slack (Δ slack) is determined based on the total slack and the slack threshold (slack_TH). At operation 544, a path ratio is calculated based on the path delay and the slack threshold (slack_TH)

Turning again to FIG. 5B, a delay offset (Δ delay) is calculated at operation 546. At operation 548, an apportioned arrival time is determined based on the arrival time associated with the output pin and the delay offset (Δ delay), and the apportioned arrival time is stored in the assertion file (i.e., the ETA of the assertion file) at operation 550. At operation 552, a residual slack apportionment value (slack$_{APP}$) is determined based on the residual slack (Δ slack) and the number of macros (n$_{MACROS}$). At operation 554, the residual slack apportionment value (slack$_{APP}$) is added to the apportioned arrival time to generate a modified apportioned arrival time. At operation 556, the ETA is updated with the modified apportioned arrival time, and the method ends at operation 530.

As described herein, various non-limiting embodiments of the invention provide an IC timing analysis system configured to perform slack apportionment by applying an even apportionment of slack to a time deficient signal path based on a positive slack threshold. A first portion of the total slack that is less than or equal to the positive slack threshold is apportioned based on a "path ratio" indicating the relationship between the sum of the total path delay of the signal path and the total slack with respect to the total path delay itself. The remaining second portion of the total slack is then apportioned evenly among all the macros associated with the targeted signal path. In this manner, a significantly larger positive slack allocation is available to downstream macros to achieve significant power reduction compared to traditional slack apportionment techniques.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of performing slack apportionment for an integrated circuit (IC), the method comprising:
    selecting a target pin corresponding to a signal path for slack apportionment and determining an arrival time corresponding to the target pin;
    determining a total slack associated with the signal path and determining a slack threshold value that is equal to a portion of the total slack;
    determining an apportioned arrival time associated with the signal path based on the arrival time and a delay offset value;
    determining a residual slack apportionment value based on a residual slack and the number of macros associated with the signal path; and
    determining a modified apportioned arrival time based on the residual slack apportionment value and the apportioned arrival time.

2. The method of claim 1, wherein the residual slack apportionment value is based on an equal distribution of the residual slack apportionment value among the number of macros.

3. The method of claim 2, wherein the residual slack is a difference between the total slack and the slack threshold value.

4. The method of claim 3, wherein the delay offset value is determined by:

determining a total path delay associated with the signal path;
    determining a path ratio based on the total path delay and the slack threshold value; and
    determining a delay offset value based on an upstream delay portion of the total path delay and the path ratio.

5. The method of claim 4, further comprising:
    storing the apportioned arrival time in an assertion file; and
    updating the assertion file based on the modified apportion time.

6. The method of claim 5, further comprising:
    determining whether the target pin is one of an input pin configured to deliver data to a corresponding signal path or an output pin configured to receive data from a corresponding signal path,
    wherein storing the apportioned arrival time in the assertion file comprises one of storing the apportioned arrival time as a primary input specification (PIS) value corresponding to the input pin or storing the apportioned arrival time as an estimated time of arrival (ETA) value corresponding to the output pin.

7. The method of claim 6, wherein updating the assertion file comprises one of subtracting the residual slack apportionment value from the apportioned arrival time based on determining the target pin is an input pin or adding the residual slack apportionment value to the apportioned arrival time based on determining the target pin is an output pin.

8. A system configured to perform slack apportionment for an integrated circuit (IC), the system comprising:
    a time calculation module configured to determine an arrival time corresponding to a target pin in signal communication with a signal path selected for the slack apportionment and; and
    a slack apportion module configured to determine a total slack associated with the signal path and to determine a slack threshold value that is equal to a portion of the total slack,
    wherein the time calculation module is configured to determine an apportioned arrival time associated with the signal path based on the arrival time and a delay offset value and the slack apportion module is configured to determine a residual slack apportionment value based on a residual slack and the number of macros associated with the signal path, and
    wherein the time calculation module determines a modified apportioned arrival time based on the residual slack apportionment value and the apportioned arrival time.

9. The system of claim 8, wherein the residual slack apportionment value is based on an equal distribution of the residual slack apportionment value among the number of macros.

10. The system of claim 9, wherein the residual slack is a difference between the total slack and the slack threshold value.

11. The system of claim 10, wherein the slack apportion module comprises:
    a delay offset module configured to determine a total path delay associated with the signal path; and
    a path ratio module configured to determine a path ratio based on the total path delay and the slack threshold value,
    wherein the delay offset module determines the delay offset value based on an upstream delay portion of the total path delay and the path ratio.

12. The system of claim 11, wherein the time calculation module stores the apportioned arrival time in an assertion file, and updates the assertion file based on the modified apportion time.

13. The system of claim 12, further comprising:
a pin and path selection module configured to generate pin information indicating whether the target pin is one of an input pin configured to deliver data to a corresponding signal path or an output pin configured to receive data from a corresponding signal path,
wherein the time calculation module obtains the pin information from the pin and path selection module, and stores the apportioned arrival time in the assertion file as one of a primary input specification (PIS) value corresponding to the input pin or an estimated time of arrival (ETA) value corresponding to the output pin.

14. The system of claim 13, wherein updating the assertion file comprises one of subtracting the residual slack apportionment value from the apportioned arrival time based on determining the target pin is an input pin or adding the residual slack apportionment value to the apportioned arrival time based on determining the target pin is an output pin.

15. A computer program product to control a system to perform slack apportionment for an integrated circuit (IC), the computer program product comprising a computer readable storage medium having program instructions embodied therewith, the program instructions executable by an electronic computer processor to control the system to perform operations comprising:
selecting a target pin corresponding to a signal path for slack apportionment and determining an arrival time corresponding to the target pin;
determining a total slack associated with the signal path and determining a slack threshold value that is equal to a portion of the total slack;
determining an apportioned arrival time associated with the signal path based on the arrival time and a delay offset value;
determining a residual slack apportionment value based on a residual slack and the number of macros associated with the signal path; and
determining a modified apportioned arrival time based on the residual slack apportionment value and the apportioned arrival time.

16. The computer program product of claim 15, wherein the residual slack apportionment value is based on an equal distribution of the residual slack apportionment value among the number of macros.

17. The computer program product of claim 16, wherein the residual slack is a difference between the total slack and the slack threshold value.

18. The computer program product of claim 17, wherein the delay offset value is determined by:
determining a total path delay associated with the signal path;
determining a path ratio based on the total path delay and the slack threshold value; and
determining a delay offset value based on an upstream delay portion of the total path delay and the path ratio.

19. The computer program product of claim 18, further comprising:
storing the apportioned arrival time in an assertion file; and
updating the assertion file based on the modified apportion time.

20. The computer program product of claim 19, further comprising:
determining whether the target pin is one of an input pin configured to deliver data to a corresponding signal path or an output pin configured to receive data from a corresponding signal path,
wherein storing the apportioned arrival time in the assertion file comprises one of storing the apportioned arrival time as a primary input specification (PIS) value corresponding to the input pin or storing the apportioned arrival time as an estimated time of arrival (ETA) value corresponding to the output pin, and
wherein updating the assertion file comprises one of subtracting the residual slack apportionment value from the apportioned arrival time based on determining the target pin is an input pin or adding the residual slack apportionment value to the apportioned arrival time based on determining the target pin is an output pin.

* * * * *